(12) United States Patent
Hakura et al.

(10) Patent No.: US 9,792,122 B2
(45) Date of Patent: Oct. 17, 2017

(54) HEURISTICS FOR IMPROVING PERFORMANCE IN A TILE BASED ARCHITECTURE

(71) Applicant: NVIDIA CORPORATION, Santa Clara, CA (US)

(72) Inventors: Ziyad S. Hakura, Gilroy, CA (US); Walter R. Steiner, Flagler Beach, FL (US); Cynthia Ann Edgeworth Allison, Madison, AL (US); Rouslan Dimitrov, San Carlos, CA (US); Karim M. Abdalla, Menlo Park, CA (US); Dale L. Kirkland, Madison, AL (US); Emmett M. Kilgariff, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 479 days.

(21) Appl. No.: 14/046,856

(22) Filed: Oct. 4, 2013

(65) Prior Publication Data
US 2014/0118376 A1 May 1, 2014

Related U.S. Application Data

(60) Provisional application No. 61/719,271, filed on Oct. 26, 2012.

(51) Int. Cl.
*G06F 9/38* (2006.01)
*G06T 15/80* (2011.01)
(Continued)

(52) U.S. Cl.
CPC ............... *G06F 9/38* (2013.01); *G06F 9/44* (2013.01); *G06F 12/0808* (2013.01);
(Continued)

(58) Field of Classification Search
None
See application file for complete search history.

(56) References Cited

U.S. PATENT DOCUMENTS 6,323,860 B1   11/2001   Zhu et al.
6,348,919 B1 *  2/2002   Murphy ............... G06T 15/005
                                                    345/421
(Continued)

OTHER PUBLICATIONS

Non-Final Office Action for U.S. Appl. No. 14/045,361 dated Feb. 26, 2016.
(Continued)

*Primary Examiner* — Maurice L McDowell, Jr.
*Assistant Examiner* — Donna J Ricks
(74) *Attorney, Agent, or Firm* — Artegis Law Group, LLP

(57) ABSTRACT

One embodiment of the present invention includes a technique for processing graphics primitives in a tile-based architecture. The technique includes storing, in a buffer, a first plurality of graphics primitives and a first plurality of state bundles received from the world-space pipeline. The technique further includes determining, based on a first condition, that the first plurality of graphics primitives should be replayed from the buffer, and, in response, replaying the first plurality of graphics primitives against a first tile included in a first plurality of tiles. Replaying the first plurality of graphics primitives includes comparing each graphics primitive against the first tile to determine whether the graphics primitive intersects the first tile, determining that one or more graphics primitives intersects the first tile, and transmitting the one or more graphics primitives and one or more associated state bundles to a screen-space pipeline for processing.

22 Claims, 11 Drawing Sheets

(51) Int. Cl.

| | | |
|---|---|---|
| *G06F 9/44* | (2006.01) | |
| *G06F 12/08* | (2016.01) | |
| *G06T 15/50* | (2011.01) | |
| *G09G 5/395* | (2006.01) | |
| *G09G 5/00* | (2006.01) | |
| *G06T 15/40* | (2011.01) | |
| *G06T 1/20* | (2006.01) | |
| *G06T 1/60* | (2006.01) | |
| *G06T 15/00* | (2011.01) | |
| *G06F 12/0808* | (2016.01) | |
| *G06F 12/0875* | (2016.01) | |

(52) U.S. Cl.
CPC ............ *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G09G 5/003* (2013.01); *G09G 5/395* (2013.01); *G06F 2212/302* (2013.01); *Y02B 60/1225* (2013.01)

(56) References Cited

U.S. PATENT DOCUMENTS

| | | | |
|---|---|---|---|
| 6,535,209 B1 | 3/2003 | Abdalla et al. | |
| 6,697,063 B1 | 2/2004 | Zhu et al. | |
| 7,102,646 B1 * | 9/2006 | Rubinstein | G06T 15/005 345/543 |
| 7,170,515 B1 | 1/2007 | Zhu et al. | |
| 8,207,975 B1 * | 6/2012 | Molnar | G06T 15/005 345/426 |
| 8,605,102 B1 | 12/2013 | Purcell et al. | |
| 2003/0164840 A1 * | 9/2003 | O'Driscoll | G06T 11/203 345/611 |
| 2007/0165035 A1 * | 7/2007 | Duluk, Jr. | G06T 1/60 345/506 |
| 2009/0058848 A1 | 3/2009 | Howson | |
| 2010/0169608 A1 | 7/2010 | Kuo et al. | |
| 2010/0201703 A1 * | 8/2010 | Jiao | G11B 7/0065 345/589 |
| 2011/0087864 A1 * | 4/2011 | Duluk, Jr. | G06F 9/30087 712/220 |
| 2012/0304194 A1 * | 11/2012 | Engh-Halstevdt | G06F 9/4881 718/106 |
| 2013/0120380 A1 * | 5/2013 | Kallio | G06T 15/005 345/421 |

OTHER PUBLICATIONS

Non-Final Office Action for U.S. Appl. No. 14/046,249 dated May 10, 2016.

\* cited by examiner

HEURISTICS FOR IMPROVING PERFORMANCE IN A TILE BASED ARCHITECTURE

CROSS-REFERENCE TO RELATED APPLICATIONS

This application claims benefit of U.S. provisional patent application Ser. No. 61/719,271, filed Oct. 26, 2012, and titled "An Approach for Tiled Caching." The subject matter of this related application is hereby incorporated herein by reference.

BACKGROUND OF THE INVENTION

Field of the Invention

Embodiments of the present invention relate generally to graphics processing and, more specifically, to heuristics for improving performance in a tile-based architecture.

Description of the Related Art

Various graphics systems implement a tiling architecture that divides the screen-space into "tiles" and processes data associated with each tile in a particular order. That is, data associated with a first tile is processed first, data associated with a second tile is processed second, and so on. In such graphics systems, a highly parallel architecture may be implemented such that the work associated with one or more tiles is distributed to different processing entities.

In one approach to distributing work in a highly parallel architecture, graphics data received from a world-space pipeline is buffered prior to being transmitted to a number of different processing entities in one or more screen-space pipelines. By buffering the graphics data, the graphics data can be sorted and transmitted to the screen-space pipeline according to the tile(s) with which the graphics data is associated. Consequently, the graphics data can be distributed to, and processed by, the one or more screen-space pipelines in a more efficient manner. As an example, graphics data may be buffered and analyzed to determine the most efficient order in which to process the data and/or to determine which processing entities can process the data most efficiently.

One drawback to buffering graphics data, as described above, is that, under certain circumstances, buffering graphics data may negatively impact processing efficiency. For example, in some cases, buffering certain types of graphics data may consume resources (e.g., shared memory) in a graphics system such that insufficient resources are available when rendering operations are later performed with respect to the buffered graphics data. As a result, overall processing efficiency may be decreased.

In addition, under certain circumstances, dividing the screen-space into tiles and processing data associated with each tile in a particular order may be less efficient than simply processing data in the original order specified by the application programming interface (API). For example, dividing the screen-space into tiles may increase the overhead associated with processing certain types of graphics data to the point where tile-based processing is less efficient than simply processing the data according to the original API order.

As the foregoing illustrates, what is needed in the art are more effective approaches to implementing tiling functionality in graphics processing systems.

SUMMARY OF THE INVENTION

One embodiment of the present invention includes a method for processing graphics primitives in a tile-based architecture. The method includes storing, in a buffer, a first plurality of graphics primitives and a first plurality of state bundles received from the world-space pipeline. The method further includes determining, based on a first condition, that the first plurality of graphics primitives should be replayed from the buffer, and, in response, replaying the first plurality of graphics primitives against a first tile included in a first plurality of tiles. Replaying the first plurality of graphics primitives includes comparing each graphics primitive against the first tile to determine whether the graphics primitive intersects the first tile, determining that one or more graphics primitives intersects the first tile, and transmitting the one or more graphics primitives and one or more associated state bundles to a screen-space pipeline for processing.

One advantage of the disclosed techniques is that tiling can be enabled and disabled in an intelligent manner in order to reduce overhead in the processing pipeline. In addition, when tiling is enabled, the buffering of graphics primitives and associated state can be controlled to further decrease overhead in the processing pipeline and, as a result, decrease power consumption of the graphics system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
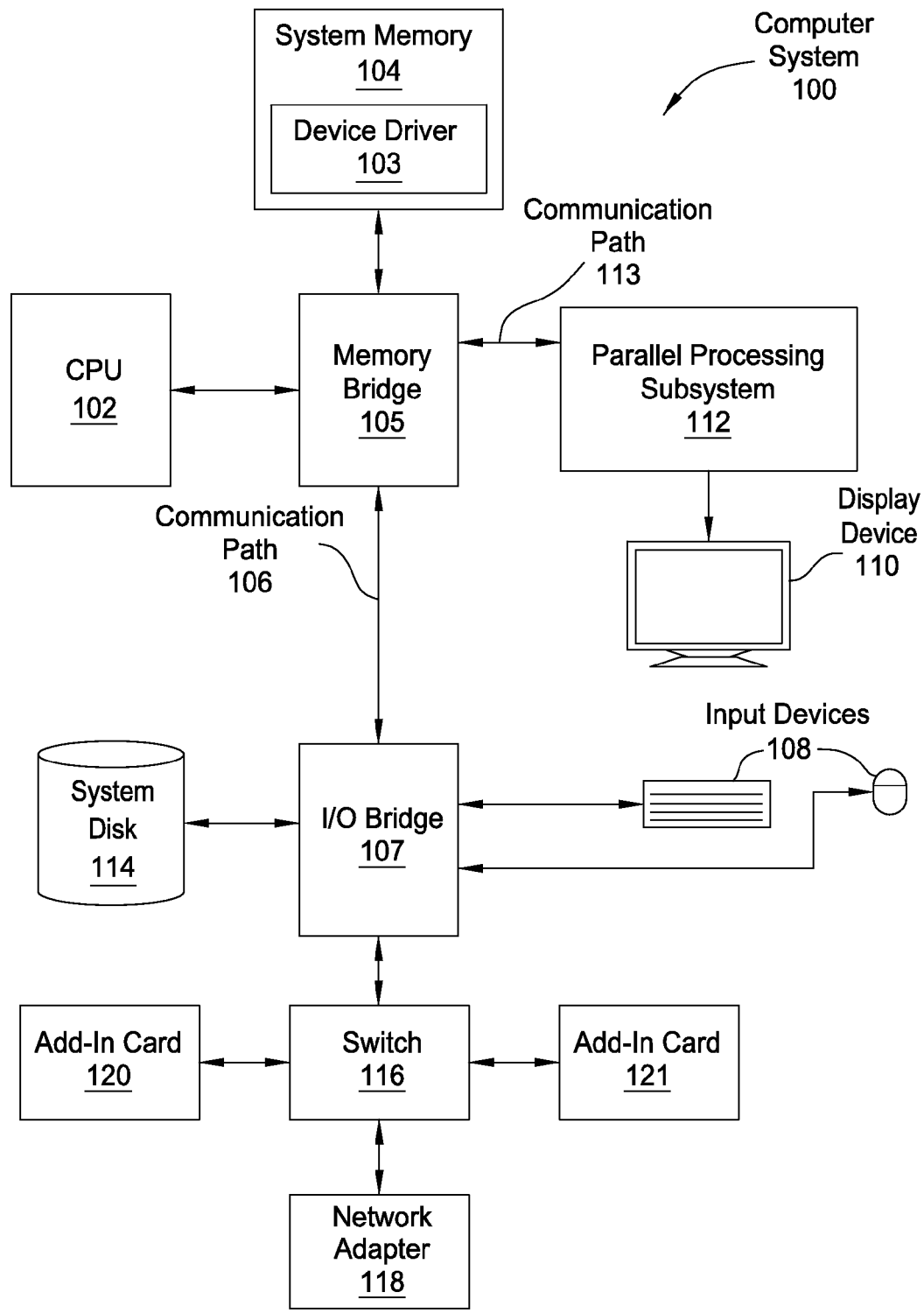
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
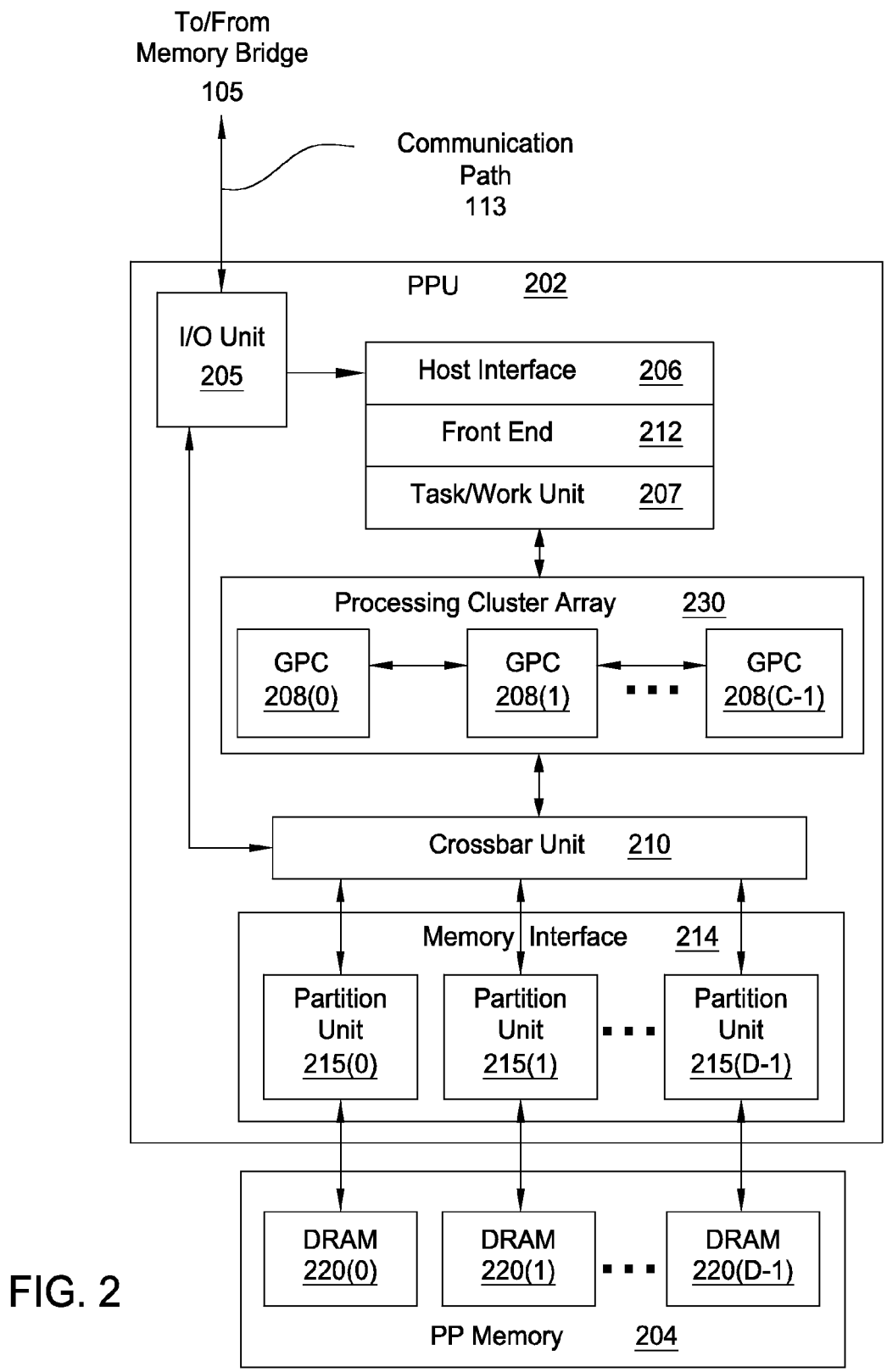
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
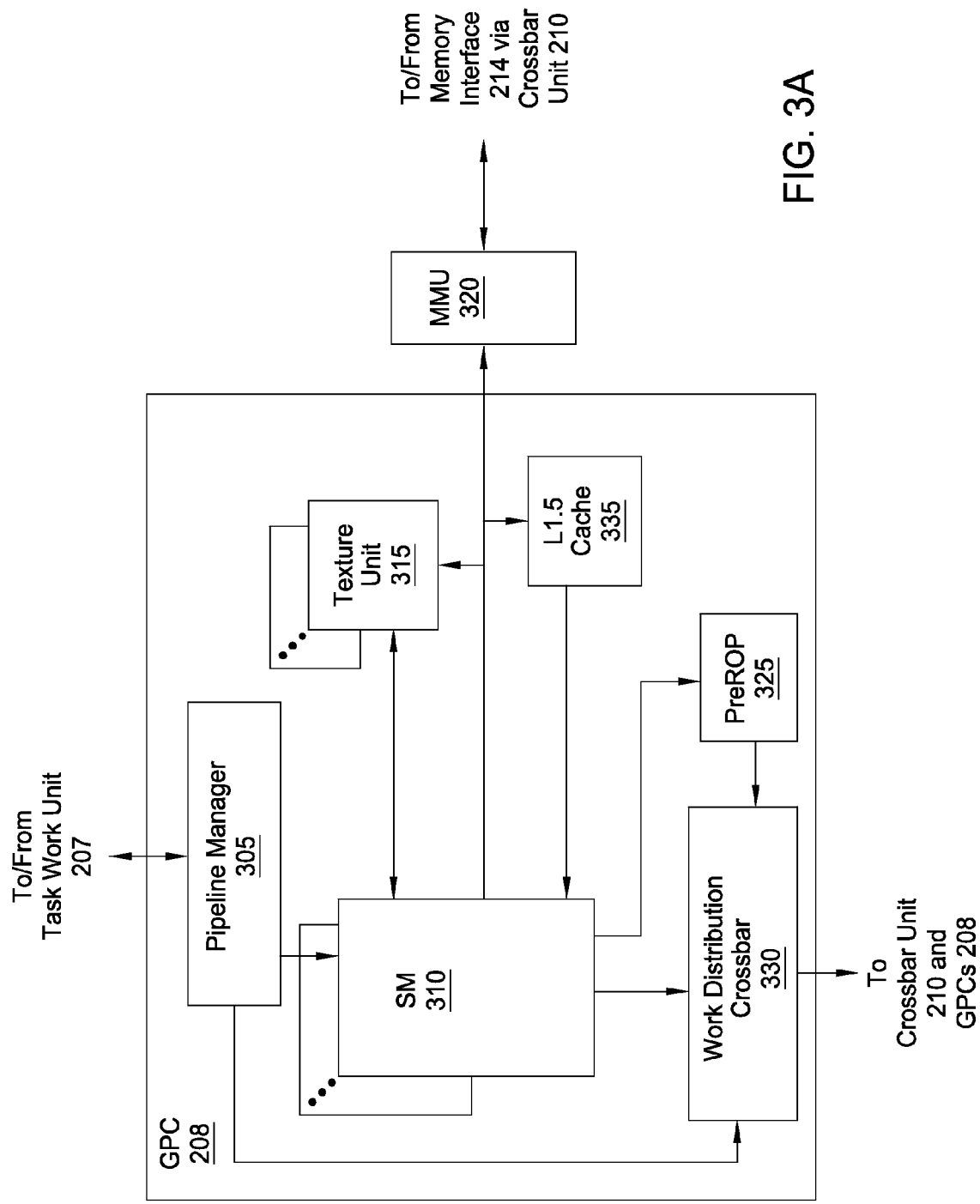
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
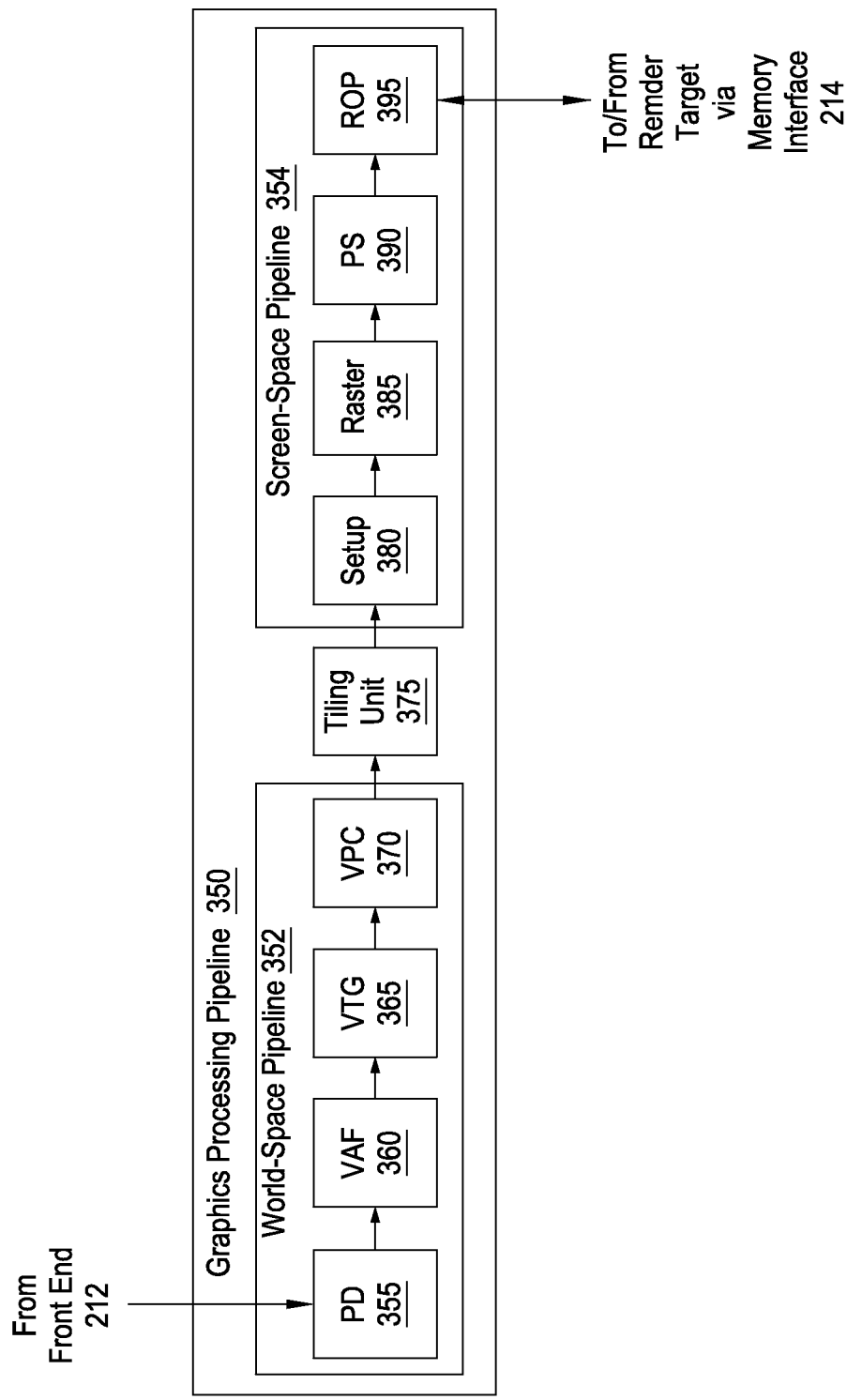
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives, for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world-space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world-space pipeline 352 and a screen-space pipeline 354, as further described herein. Graphics primitives are processed in the world-space pipeline 352 and then transmitted to the tiling unit 375. In various embodiments, the tiling unit 375 includes a buffer in which graphics primitives and state may be stored prior to transmission to the screen-space pipeline 354. The screen-space is divided into cache tiles, where each cache tile is associated with a portion of the screen-space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world-space pipeline 352, but are then transmitted multiple times to the screen-space pipeline 354.

Such a technique improves cache memory locality during processing in the screen-space pipeline 354, where multiple memory operations associated with a first cache tile access a region of the L2 caches, or any other technically feasible cache memory, that may stay resident during screen-space processing of the first cache tile. Once the graphics primitives associated with the first cache tile are processed by the screen-space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen-space processing of the second cache tile. Accordingly, the overall memory traffic to the L2 caches and to the render targets may be reduced. In some embodiments, the world-space computation is performed once for a given graphics primitive irrespective of the number of cache tiles in screen-space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world-space pipeline 352 and a screen-space pipeline 354. The world-space pipeline 352 processes graphics objects in 3D space, where the position of each graphics object is known relative to other graphics objects and relative to a 3D coordinate system. The screen-space pipeline 354 processes graphics objects that have been projected from the 3D coordinate system onto a 2D planar surface representing the surface of the display device 110. For example, the world-space pipeline 352 could include pipeline stages in the graphics processing pipeline 350 from the PD 355 through the VPC 370. The screen-space pipeline 354 could include pipeline stages in the graphics processing pipeline 350 from the setup unit 380 through the ROP 395. The tiling unit 375 would follow the last stage of the world-space pipeline 352, namely, the VPC 370. The tiling unit 375 would precede the first stage of the screen-space pipeline 354, namely, the setup unit 380.

In some embodiments, the world-space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
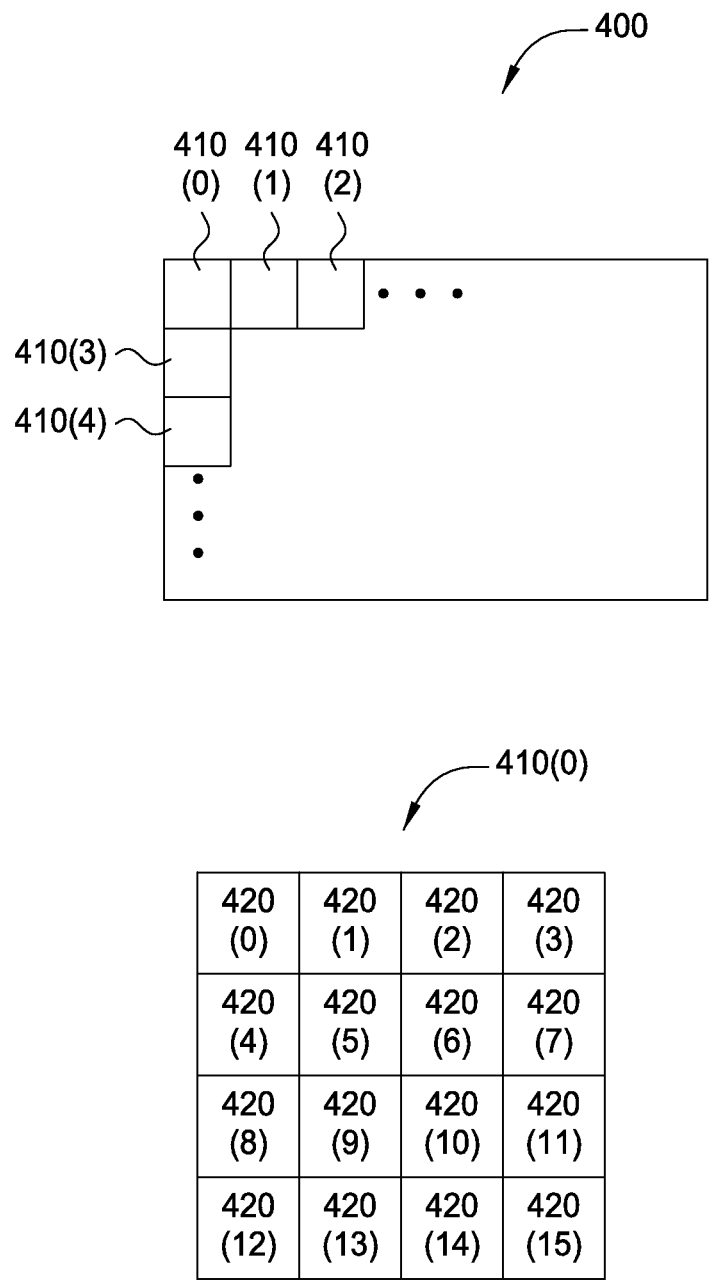
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen-space 400 and is divided into multiple raster tiles 420.

The screen-space 400 represents one or more memory buffers configured to store rendered image data and other data transmitted by functional units within the graphics processing pipeline 350. In some embodiments, the one or more memory buffers may be configured as one or more render targets. The screen-space represents a memory buffer configured to store the image rendered by the graphics processing pipeline 350. The screen-space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen-space. In operation, once rendering completes, the pixels in the one or more render targets may be transmitted to a display device in order to display the rendered image.

By way of example, a set of render targets for the screen-space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen-space 400. For clarity, only five cache tiles 410(0)-410(4) are shown in FIG. 4. In some embodiments, cache tiles may have an arbitrary size in X and Y screen-space. For example, if a cache tile were to reside in a cache memory that also is used to store other data, then the cache tile could be sized to consume only a specific portion of the cache memory. The size of a cache tile may be based on a number of factors, including the quantity and configuration of the render targets associated with the screen-space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

When tiling is enabled, the tiling unit 375 buffers graphics primitives and state received from the world-space pipeline 352 prior to transmitting the graphics primitives and state to the screen-space pipeline 354. Once a sufficient number of graphics primitives and state have been buffered, the tiling unit 375 initiates a replay. During a replay of buffered graphics primitives and state, the tiling unit 375 selects a cache tile 410 associated with the screen-space 400 and determines which of the buffered graphics primitives intersect the cache tile 410. If a graphics primitive intersects the cache tile 410, then the tiling unit 375 transmits the graphics primitive and one or more state bundles associated with the graphics primitive to the screen-space pipeline 354 for processing. While a single cache tile 410 is selected, the tiling unit repeats the process of determining which graphics primitives intersect the cache tile 410 for all of the graphics primitives buffered in the tiling unit 375. Once all of the graphics primitives buffered in the tiling unit 375 are examined for a particular cache tile 410, the tiling unit 375 selects the next cache tile 410. With the next cache tile 410 selected, the tiling unit 375 repeats the process of determining which of the buffered graphics primitives (if any) intersect the cache tile 410 and transmitting the intersecting graphics primitives and associated state to the screen-space pipeline 354. During a single replay, this process is repeated for multiple cache tiles 410 associated with the screen-space 400.

In one embodiment, during a single replay, the tiling unit 375 repeats the process of determining which of the buffered graphics primitives intersect a cache tile 410 and transmitting the intersecting graphics primitives (if any) and associated state to the screen-space pipeline 354 for all of the cache tiles 410 associated with the screen-space 400. For example, with reference to FIG. 4, the tiling unit 375 would first process cache tile 410(0) (i.e., by determining which buffered graphics primitives intersect the cache tile 410(0) and transmitting the graphics primitives and associated state to the screen-space pipeline 354), followed by cache tile 410(1), followed by cache tile 410(2), and so on, until all of the cache tiles 410 associated with the screen-space 400 have been processed. In other embodiments, the replay may be performed by processing all, or less than all, of the cache tiles 410 in a non-sequential order.

Heuristics for Improving Performance in a Tile-Based Architecture

Under certain circumstances, buffering graphics primitives and state received from the world-space pipeline 352 and/or transmitting graphics primitives and state to the screen-space pipeline 354 with tiling enabled may negatively impact processing efficiency. Accordingly, in various embodiments, the buffer may be flushed and/or the tiling function may be disabled when one or more conditions are detected by the tiling unit 375, front end unit 212, and/or buffer manager. For example, buffering graphics primitives and state for a given replay may deplete a shared system resource to the point that buffering additional graphics primitives and state will decrease processing efficiency. As an example, buffering graphics primitives and state causes shader registers (e.g., shader banks) to be bound to entries in a constant buffer. However, if the number of shader constant buffer bindings reaches a threshold level, then an insufficient number of binding table entries may be available to the front end unit 212 during a replay, causing overall processing efficiency to decrease. Thus, once the number of shader constant buffer bindings reaches a threshold level, the buffer may be flushed and the buffered graphics primitives and state may be transmitted to the screen-space pipeline 354 for processing. Additionally, when entries in the constant buffer are updated, data associated with the updated constant buffer entry may be stored in a constant buffer page pool. However, if the number of available constant buffer page pool entries falls below a threshold level, then overall processing efficiency may decrease. Thus, once the number of constant buffer updates (or the number of allocated constant buffer page pool entries) reaches a threshold level, the buffer may be flushed and the buffered graphics primitives and state may be transmitted to the screen-space pipeline 354 for processing.

In addition, under certain circumstances, dividing the screen-space 400 into cache tiles 410 and transmitting the graphics primitives and state associated with each cache tile 410 in a particular order may be less efficient than simply processing the graphics primitives and state in the order specified by the application programming interface (API). For example, when the amount of state buffered by the tiling unit 375 is disproportionately high relative to the number of buffered graphics primitives, then the overhead associated with transmitting the state to the screen-space pipeline 354 multiple times (e.g., once for each cache tile 410) may negatively impact processing efficiency. That is, repeatedly transmitting the state to the screen-space pipeline 354 when processing multiple cache tiles 410 during a replay may be less efficient than disabling the tiling function and transmitting the graphics primitives and state in the order specified by the application programming interface (API). As such, in order to avoid such inefficiencies, once the amount of state buffered by the tiling unit 375 reaches a threshold level, the buffer may be flushed and the buffered graphics primitives and state may be transmitted to the screen-space pipeline 354 for processing.

Accordingly, in various embodiments, the tiling unit 375, front end unit 212, and/or buffer manager are configured cause a buffer to be flushed and/or a tiling function to be disabled when one or more conditions are detected. Such techniques are discussed below in further detail in conjunction with FIGS. 5-9B.

Figure 5:
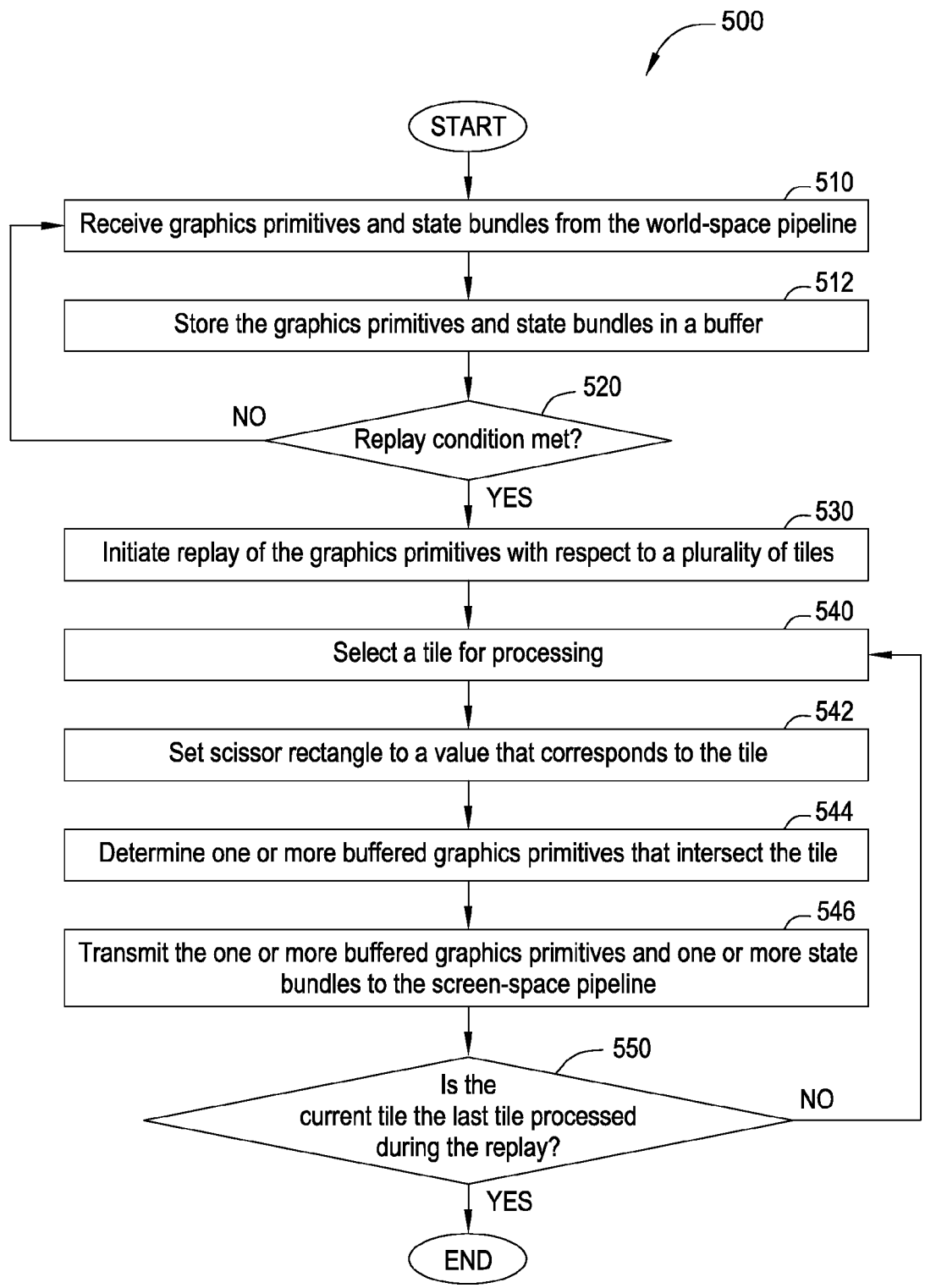
FIG. 5 is a flow diagram of method steps for buffering and replaying graphics primitives and state in a tile-based architecture, according to one embodiment of the present invention.

FIG. 5 is a flow diagram of method steps for buffering and replaying graphics primitives and state in a tile-based architecture, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 500 begins at step 510, where the tiling unit 375 receives graphics primitives and state from the world-space pipeline 352. At step 512, the tiling unit 375 stores the graphics primitives and state in a buffer, such as a buffer included in the tiling unit 375. At step 520, the tiling unit 375, front end unit 212, and/or buffer manager determines whether a replay condition has been met. If the replay condition has not been met, then the method 500 returns to steps 510 and 512, where additional graphics primitives and state are received and stored in the buffer. If the replay condition has been met, then, at step 530, the tiling unit 375 initiates a replay of the buffered graphics primitives and state.

The replay condition detected by the tiling unit 375, front end unit 212, and/or buffer manager may be based on a variety of criteria, several of which are described below in detail in conjunction with FIGS. 7-9B. However, in general, the replay condition is based on one or more criteria which indicate that buffering additional graphics primitives and/or state may negatively impact processing efficiency, and, thus, a replay of the buffered graphics primitives and state should be initiated. In one embodiment, the tiling unit 375 may determine that the replay condition has been met by determining that the buffer, or a specified percentage of the buffer, is full. In other embodiments, the tiling unit 375 may determine that the replay condition has been met by determining that graphics data stored in the buffer has a particular composition. For example, the tiling unit 375 may determine that a ratio of graphics primitives to state has reached a threshold level, that graphics primitives or state occupy a percentage of the buffer capacity, and/or that other types of graphics data stored in the buffer have reached a threshold level (e.g., ratio, percentage, and the like). In yet another embodiment, the tiling unit 375 may determine that the replay condition has been met based on temporal considerations, such as by determining that a threshold period of time has elapsed since a replay was performed. In still other embodiments, the tiling unit 375 may determine that the replay condition has been met by determining that certain types of state have been received from the world-space pipeline 352. For example, the tiling unit 375 may determine that state indicative of a rendering transition, such as a transition from early z-testing to late z-testing, was received and, in response, initiate a replay.

In addition, other units may be responsible for determining when the replay condition has been met. In one embodiment, the front end unit 212 and/or the buffer manager may monitor shared system resources, such as shader constant buffer bindings and binding table entries, and determine when the shared system resources have been depleted to a threshold level. In response, the front end unit 212 may transmit state (e.g., a data packet) to the tiling unit 375 which indicates that a replay should be initiated.

After the tiling unit 375 initiates a replay, at step 540, the tiling unit 375 selects a cache tile 410 for processing. At step 542, the tiling unit 375 optionally sets a scissor rectangle to a value that corresponds to the cache tile 410. Next, at step 544, the tiling unit 375 processes buffered graphics primitives to determine which graphics primitives intersect the cache tile 410. In one embodiment, the tiling unit 375 determines which graphics primitives intersect the cache tile 410 by comparing the graphics primitives to the scissor rectangle. If a particular graphics primitive intersects the cache tile 410, then, at step 546, the tiling unit 375 transmits the graphics primitive and state associated with the graphics primitive to the screen-space pipeline 354 for processing.

Finally, at step 550, the tiling unit 375 determines whether the current cache tile 410 selected at step 540 is the last cache tile 410 to be processed during the replay. In one embodiment, the tiling unit 375 determines whether the current cache tile 410 is the last cache tile 410 to be processed during the replay by determining whether all of the cache tiles 410 associated with the screen-space 400 have been processed during the replay. If the current cache tile 410 is not the last cache tile 410 to be processed during the replay, then the method 500 returns to step 540, where the tiling unit 375 selects an additional cache tile 410 for processing. If the current cache tile 410 is the last cache tile 410 to be processed during the replay, then the method 500 ends.

Figure 6:
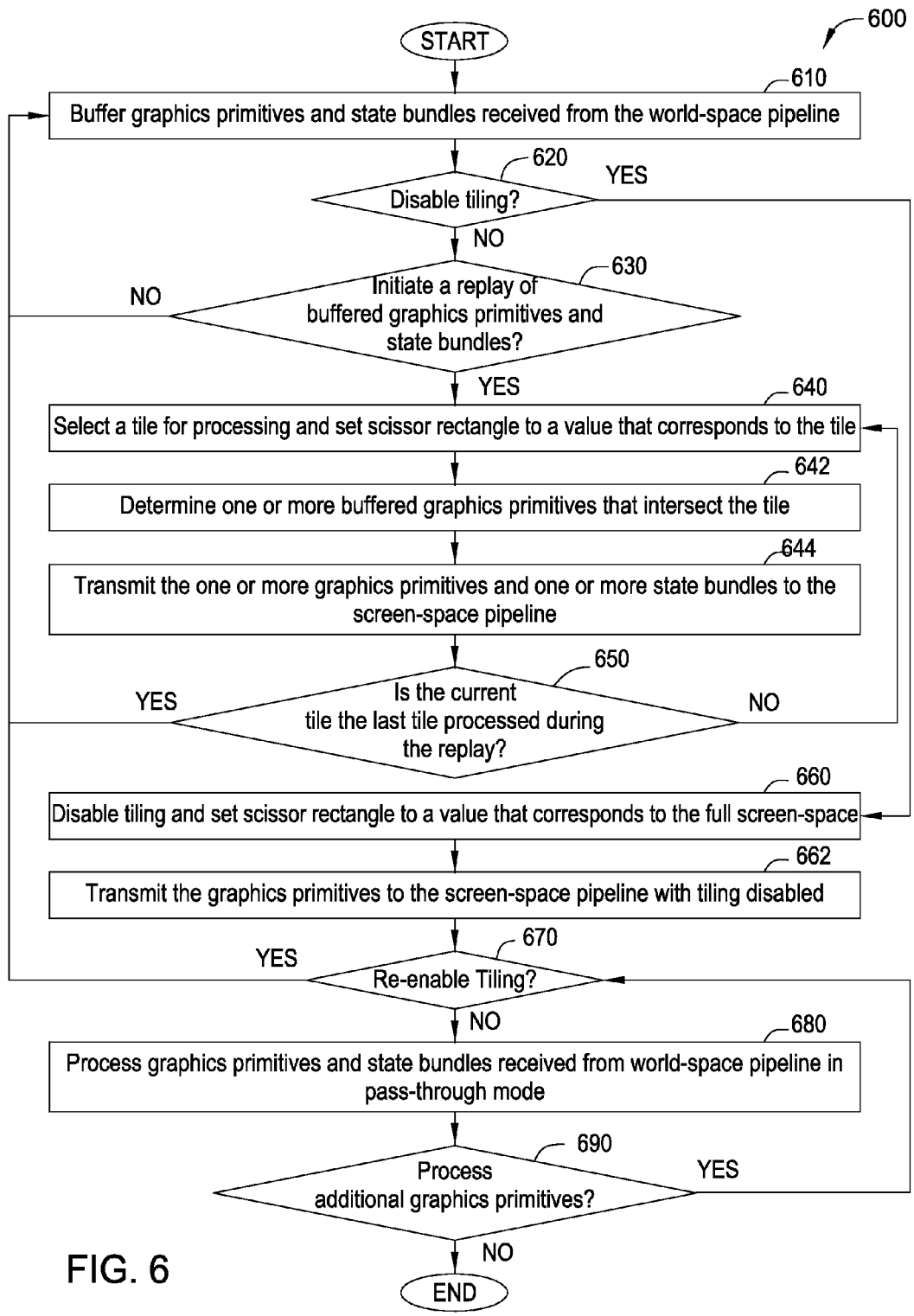
FIG. 6 is a flow diagram of method steps for determining whether to implement tiling functionality in a graphics processing system, according to one embodiment of the present invention.

FIG. 6 is a flow diagram of method steps for determining whether to implement tiling functionality in a graphics processing system, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 600 begins at step 610, where the tiling unit 375 buffers graphics primitives and state received from the world-space pipeline 352. At step 620, the tiling unit 375, front end unit 212, and/or buffer manager determine whether to disable a tiling function based on a disable tiling condition. If the disable tiling condition has not been met, then the method 600 proceeds to step 630 and determines whether a replay of the buffered graphics primitives and state should be initiated. The tiling unit 375 may determine that a replay should be initiated based on any of the replay conditions described above with respect to the method 500 of FIG. 5. If, at step 630, the tiling unit 375 determines that a replay should not be initiated, then the method 600 returns to step 610, where additional graphics primitives and state are received and stored in the buffer.

If, at step 630, the tiling unit 375 determines that a replay should be initiated, then, at step 640, the tiling unit 375 selects a cache tile 410 for processing and optionally sets a scissor rectangle to a value that corresponds to the cache tile 410. Steps 642 and 644 are then performed in the same manner as described above with respect to steps 544 and 546 in the method 500 of FIG. 5.

Next, at step 650, the tiling unit 375 determines whether the current cache tile 410 selected at step 640 is the last cache tile 410 to be processed during the replay. If the current cache tile 410 is not the last cache tile 410 to be processed during the replay, then the method 600 returns to step 640, where the tiling unit 375 selects an additional cache tile 410 for processing. If the current cache tile 410 is the last cache tile 410 to be processed during the replay, then the method 600 returns to step 610, where another set of graphics primitives and state are received from the world-space pipeline 352 and buffered by the tiling unit 375.

If, at step 620, the tiling unit 375, front end unit 212, and/or buffer manager determine that the disable tiling condition has been met, then the method 600 proceeds to step 660. The disable tiling condition detected the tiling unit 375, front end unit 212, and/or buffer manager may be based on variety of criteria, several of which are described below in detail in conjunction with FIGS. 7-9B. However, in general, tiling may be disabled based on one or more criteria which indicate that replaying the buffered graphics primitives and/or state with respect to multiple cache tiles 410 may negatively impact processing efficiency. In one embodiment, the tiling unit 375 may determine that the disable tiling condition has been met by determining that graphics data stored in the buffer has a particular composition. For example, the tiling unit 375 may determine that a ratio of graphics primitives to state has reached a threshold level, that graphics primitives or state occupy a percentage of the buffer capacity, and/or that other types of graphics data stored in the buffer has reached a threshold level (e.g., ratio, percentage, and the like).

In other embodiments, the tiling unit 375 may determine that the disable tiling condition has been met based on temporal considerations, such as by determining that a threshold period of time has elapsed since a replay was performed. For example, the tiling unit 375 may determine that the rate at which graphics primitives and/or state are received from the world-space pipeline 352 is below a threshold level, and, as a result, replays are occurring too infrequently. In response, the tiling unit 375 may flush the buffer and process additional graphics primitives and state received from the world-space pipeline 352 in a pass-through mode, as described below with respect to step 680.

In still other embodiments, the tiling unit 375 may determine that the disable tiling condition has been met by determining that certain types of state have been received from the world-space pipeline 352. For example, the tiling unit 375 may receive state (e.g., an instruction transmitted by the API) indicating that a late-binding decision was made to disable tiling and flush the buffer. In another example, the tiling unit 375 may determine that state indicative of a rendering transition, such as a transition from early z-testing to late z-testing, was received. In response, the tiling unit 375 may temporarily disable tiling and process one or more graphics primitives and/or state in a pass-through mode, as described in further detail in conjunction with FIG. 7.

In addition, other units may be responsible for determining when the disable tiling condition has been met. In one embodiment, the front end unit 212 and/or the buffer manager may monitor shared system resources, such as shader constant buffer bindings and binding table entries, and determine when the shared system resources have been depleted to a threshold level. In response, the front end unit 212 may transmit state to the tiling unit 375 which indicates that the buffer should be replayed with tiling enabled.

After determining that the disable tiling condition has been met, at step 660, the tiling unit 375 disables the tiling function and sets a scissor rectangle to a value that corresponds to the full screen-space 400. Then at step 662, the tiling unit 375 flushes the buffer by transmitting the graphics primitives and state to the screen-space pipeline 354 with tiling disabled. That is, at step 662, the tiling unit 375 transmits the graphics primitives and state stored in the buffer to the screen-space pipeline 354 without regard to the cache tile(s) 410 intersected by the graphics primitives.

Next, at step 670, after flushing the buffer, the tiling unit 375 determines whether the next set of graphics primitives and state should be received from the world-space pipeline 352 with the tiling enabled. That is, at step 670, the tiling unit 375 determines whether the next set of graphics primitives and state should be buffered to enable the graphics primitives and state to be replayed for multiple cache tiles 410 associated with the screen-space 400. If the tiling unit 375 determines that the tiling function should be re-enabled, then the tiling unit 375 re-enables tiling, and the method 600 returns to step 610. If the tiling unit 375 determines that the tiling function should not be re-enabled (i.e., the tiling function should remain disabled), then the method 600 proceeds to step 680, where the tiling unit 375 optionally transmits the next set of graphics primitives and state received from the world-space pipeline 352 to the screen-space pipeline 354 in a pass-through mode. Specifically, when the tiling unit 375 is in the optional pass-through mode, the tiling unit 375 transmits graphics primitives and state to the screen-space pipeline 354 in the order they are received from the world-space pipeline 352 and does not buffer or re-order the graphics primitives and state.

Finally, at step 690, the tiling unit 375 determines whether additional graphics primitives and state are to be processed. If additional graphics primitives and state are to be processed, then the method 600 returns to step 670, where the tiling unit 375 determines whether the tiling function should be re-enabled. If no additional graphics primitives and state are to be processed, then the method 600 ends.

Figure 7:
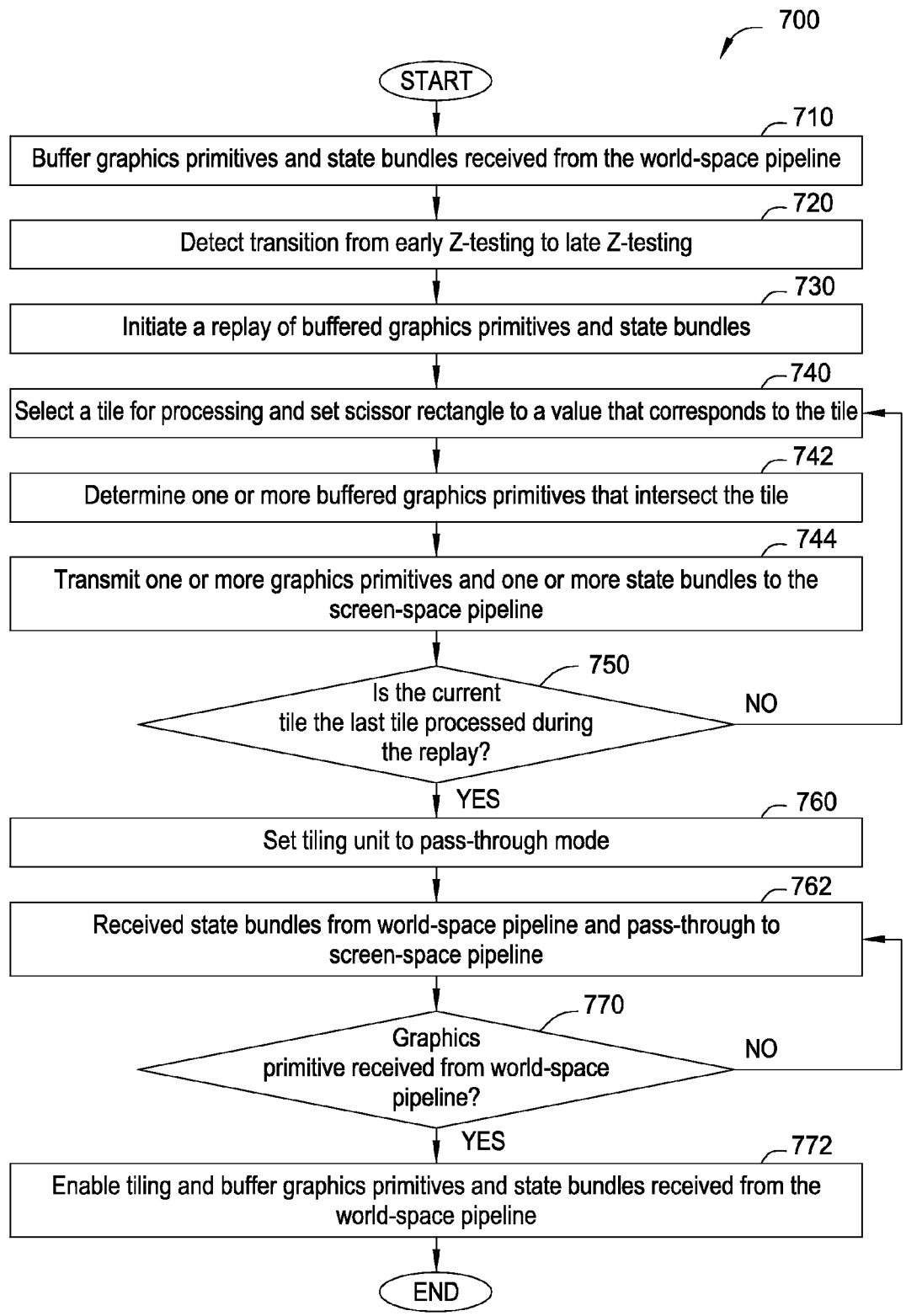
FIG. 7 is flow diagram of method steps for transmitting graphics primitives and state to a screen-space pipeline during a transition between early z-testing and late z-testing, according to one embodiment of the present invention.

FIG. 7 is flow diagram of method steps for transmitting graphics primitives and state to a screen-space pipeline during a transition between early z-testing and late z-testing, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 700 begins at step 710, where the tiling unit 375 buffers graphics primitives and state received from the world-space pipeline 352. At step 720, the tiling unit 375 detects a transition from early z-testing to late z-testing, or from late z-testing to early z-testing. For example, the tiling unit 375 may detect the transition by determining that state received from the world-space pipeline 352 (e.g., an instruction transmitted by the API) indicates that a transition between early z-testing and late z-testing is going to take place or has already taken place. In response, at step 730, the tiling unit 375 initiates a replay of the graphics primitives and state stored in the buffer. In one embodiment, the replay is performed with respect to graphics primitives and state that are received by the tiling unit 375 before the transition from early z-testing to late z-testing (or from late z-testing to early z-testing), but not for graphics primitives and state are received after the transition was detected.

Next, at step 740, the tiling unit 375 selects a cache tile 410 for processing and optionally sets a scissor rectangle to a value that corresponds to the cache tile 410. Steps 742 and 744 are then performed in the same manner as described above with respect to steps 544 and 546 in the method 500 of FIG. 5. At step 750, the tiling unit 375 determines whether the current cache tile 410 selected at step 740 is the last cache tile 410 to be processed during the replay. If the current cache tile 410 is not the last cache tile 410 to be processed during the replay, then the method 700 returns to step 740, where the tiling unit 375 selects an additional cache tile 410 for processing. If the current cache tile 410 is the last cache tile 410 to be processed during the replay, then the method 700 proceeds to step 760, where the tiling unit 375 is set to the pass-through mode.

At step 760, the tiling unit 375 enters the pass-through mode and, at step 762, processes state received from the world-space pipeline 352 in the pass-through mode. As described above with respect to step 680 of method 600, when in the pass-through mode, the tiling unit 375 transfers graphics primitives and state received from the world-space pipeline 352 to the screen-space pipeline 354 without buffering or re-ordering the graphics primitives and state. In order to reduce the hysteresis associated with switching between early z-testing and late z-testing, state associated with the transition is transmitted (e.g., passed through) to the screen-space pipeline 354 once, instead of being replayed for multiple cache tiles 410. In one embodiment, the state associated with the transition is state that is received from the world-space pipeline 352 immediately after a transition between early z-testing and late z-testing is detected.

Once the state associated with the transition from late z-testing (or from late z-testing to early z-testing) is passed through to the screen-space pipeline 354, the tiling function may be re-enabled. In one embodiment, at step 770, the tiling unit 375 determines whether all of the state associated with the transition has been passed through to the screen-space pipeline 354 by determining whether a graphics primitive has been received from the world-space pipeline 352 since the buffer was replayed. If a graphics primitive has not been received from the world-space pipeline 352, then the tiling unit 375 continues to process state in a pass-through mode. If a graphics primitive was received from the world-space pipeline 352, then the method 700 proceeds to step 772. At step 772, the tiling function is re-enabled, additional graphics primitives and state received from the world-space pipeline 352 are buffered, and the method 700 ends.

Figure 8:
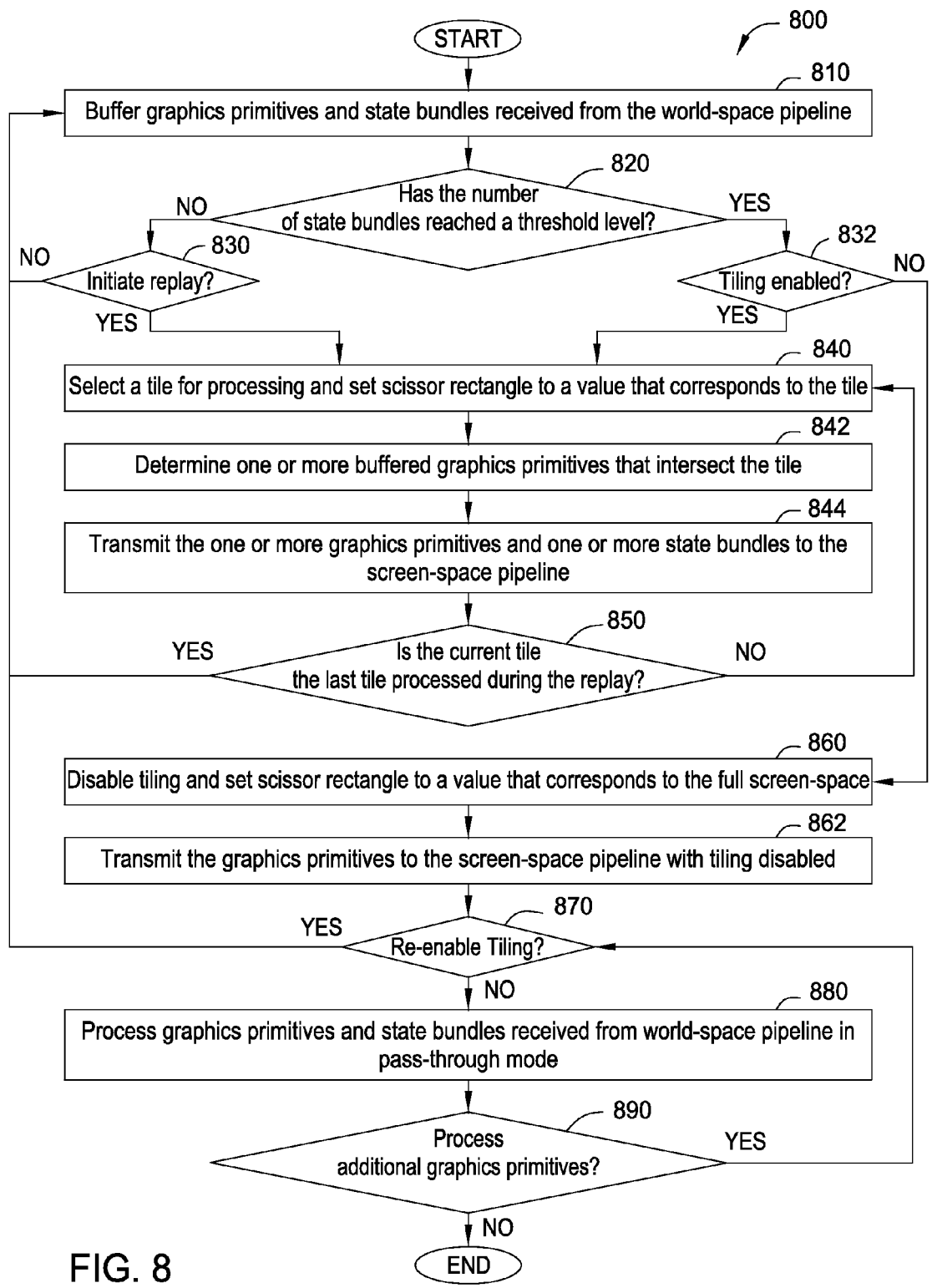
FIG. 8 is a flow diagram of method steps for transmitting graphics primitives and state to a screen-space pipeline based on state stored in a buffer, according to one embodiment of the present invention.

FIG. 8 is a flow diagram of method steps for transmitting graphics primitives and state to a screen-space pipeline based on state stored in a buffer, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 800 begins at step 810, where the tiling unit 375 buffers graphics primitives and state received from the world-space pipeline 352. At step 820, the tiling unit 375 determines whether the amount of state received from the world-space pipeline 352 has reached a threshold level. As described above, if the amount of state buffered by the tiling unit 375 is disproportionately high relative to the capacity of the buffer and/or the number of buffered graphics primitives, then the overhead associated with transmitting the state to the screen-space pipeline 354 for each cache tile 410 processed during a replay may negatively impact processing efficiency. Thus, the tiling unit 375 may monitor the amount of state stored in the buffer and initiate a replay when the amount of state reaches a threshold level. Once the amount of state reaches the threshold level, a replay may be initiated.

In one embodiment, the threshold level may correspond to a percentage of the capacity of a buffer in which the state in stored (e.g., one quarter, one third, or one half of the buffer capacity) or an amount of state (e.g., a specified amount of state), above which processing efficiency may be negatively impacted, for example, during replay. In other embodiments, the threshold level may correspond to a ratio of the number of buffered state bundles to the number of buffered graphics primitives (e.g., 3:1, 5:1, 10:1, etc.), above which processing efficiency may be negatively impacted.

If, at step 820, the tiling unit 375 determines that the amount of state has not reached the threshold level, then the method 800 proceeds to step 830. At step 830, the tiling unit 375 determines whether a replay is to be initiated. The tiling unit 375 may determine that a replay should be initiated based on any of the replay conditions described above with respect to the method 500 of FIG. 5. If the tiling unit 375 determines that a replay should not be initiated, then the method 800 returns to step 810, where additional graphics primitives and state are buffered. If the tiling unit 375 determines that a replay should be initiated, then the method 800 proceeds to step 840.

If, at step 820, the tiling unit 375 determines that the amount of state has reached the threshold level, then the method 800 proceeds to step 832. At step 832, the tiling unit 375 determines whether the buffered graphics primitives and state should be transmitted to the screen-space pipeline 354 with the tiling function enabled. In one embodiment, the tiling unit 375 determines whether the tiling function should be enabled based on whether tiling is likely to increase or decrease processing efficiency, as described above in conjunction with FIGS. 5-7. If, at step 832, the tiling unit 375 determines that the buffered graphics primitives and state should be transmitted to the screen-space pipeline 354 with the tiling function enabled, then the method 800 proceeds to step 840.

At step 840, the tiling unit 375 selects a cache tile 410 for processing and optionally sets a scissor rectangle to a value that corresponds to the cache tile 410. Steps 842 and 844 are performed in the same manner as described above with respect to steps 544 and 546 in the method 500 of FIG. 5. At step 850, the tiling unit 375 determines whether the current cache tile 410 selected at step 840 is the last cache tile 410 to be processed during the replay. If the current cache tile 410 is not the last cache tile 410 to be processed during the replay, then the method 800 returns to step 840, where the tiling unit 375 selects an additional cache tile 410 for processing. If the current cache tile 410 is the last cache tile 410 to be processed during the replay, then the method 800 returns to step 810, where the tiling unit 375 buffers the next set of graphics primitives and state received from the world-space pipeline 352.

If, at step 832, the tiling unit 375 determines that the buffered graphics primitives and state should be transmitted to the screen-space pipeline 354 with the tiling function disabled, then the method 800 proceeds to step 860. At step 860, the tiling unit 375 disables the tiling function and sets a scissor rectangle to a value that corresponds to the full screen-space 400. Then, at step 862, the tiling unit 375 flushes the buffer by transmitting the graphics primitives and state to the screen-space pipeline 354 with tiling disabled.

Next, at step 870, after flushing the buffer, the tiling unit 375 determines whether the next set of graphics primitives and state should be received from the world-space pipeline 352 with the tiling function enabled. If the tiling unit 375 determines that the tiling function should be re-enabled, then the tiling unit 375 re-enables tiling, and the method 800 returns to step 810. If the tiling unit 375 determines that the tiling function should not be re-enabled, then the method 800 proceeds to step 880, where the tiling unit 375 optionally transmits the next set of graphics primitives and state received from the world-space pipeline 352 to the screen-space pipeline 354 in the pass-through mode. As described above, when the tiling unit 375 is in the optional pass-through mode, the tiling unit 375 transmits graphics primitives and state to the screen-space pipeline 354 in the order they are received from the world-space pipeline 352 and does not buffer or re-order the graphics primitives and state.

Finally, at step 890, the tiling unit 375 determines whether additional graphics primitives and state are to be processed. If additional graphics primitives and state are to be processed, then the method 800 returns to step 870, where the tiling unit 375 determines whether the tiling function should be re-enabled. If no additional graphics primitives and state are to be processed, then the method 800 ends.

Figure 9A:
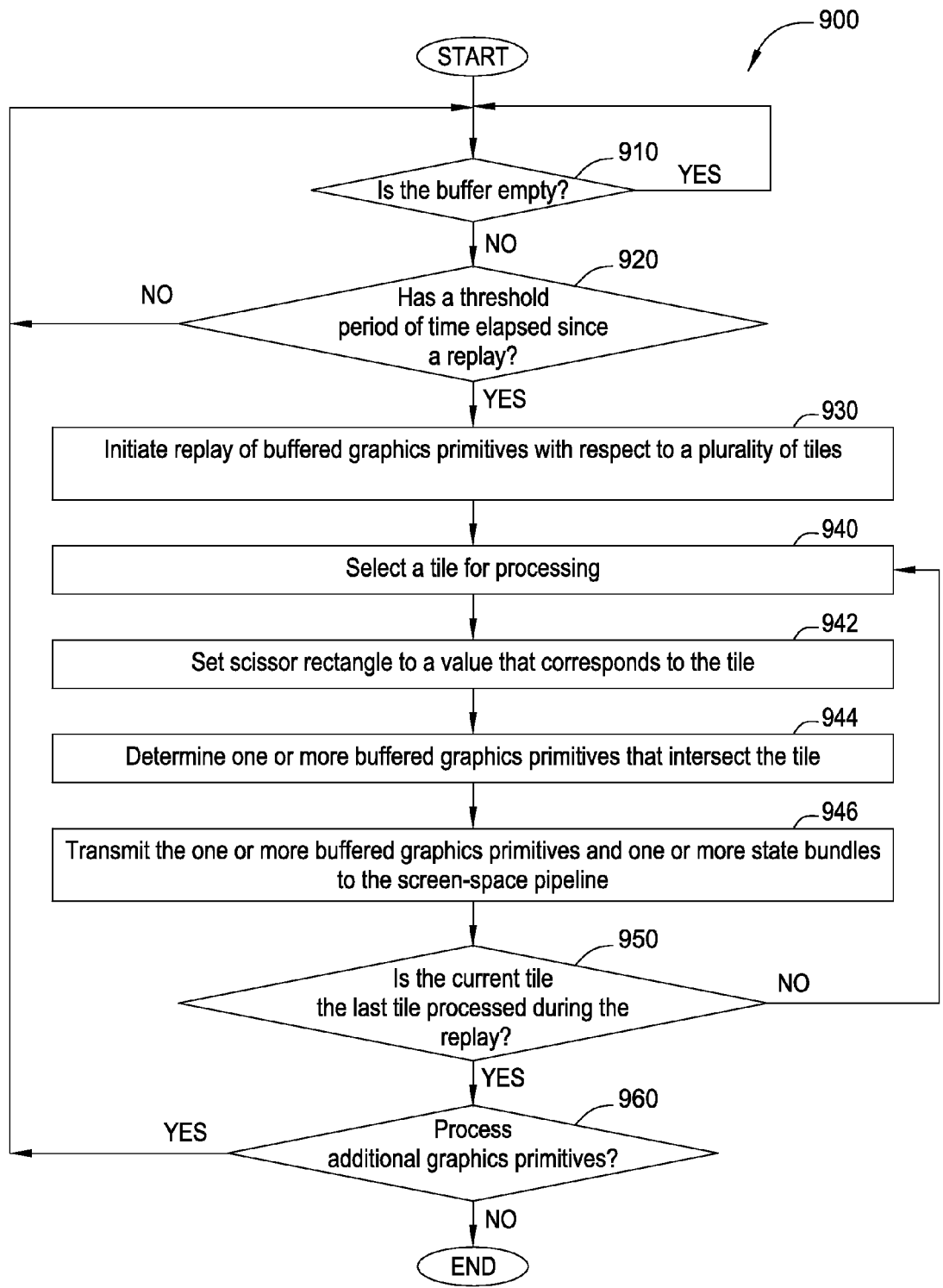
FIG. 9A is a flow diagram of method steps for transmitting graphics primitives and state to a screen-space pipeline based on the state of a buffer and the amount of time since a replay, according to one embodiment of the present invention.
Figure 9B:
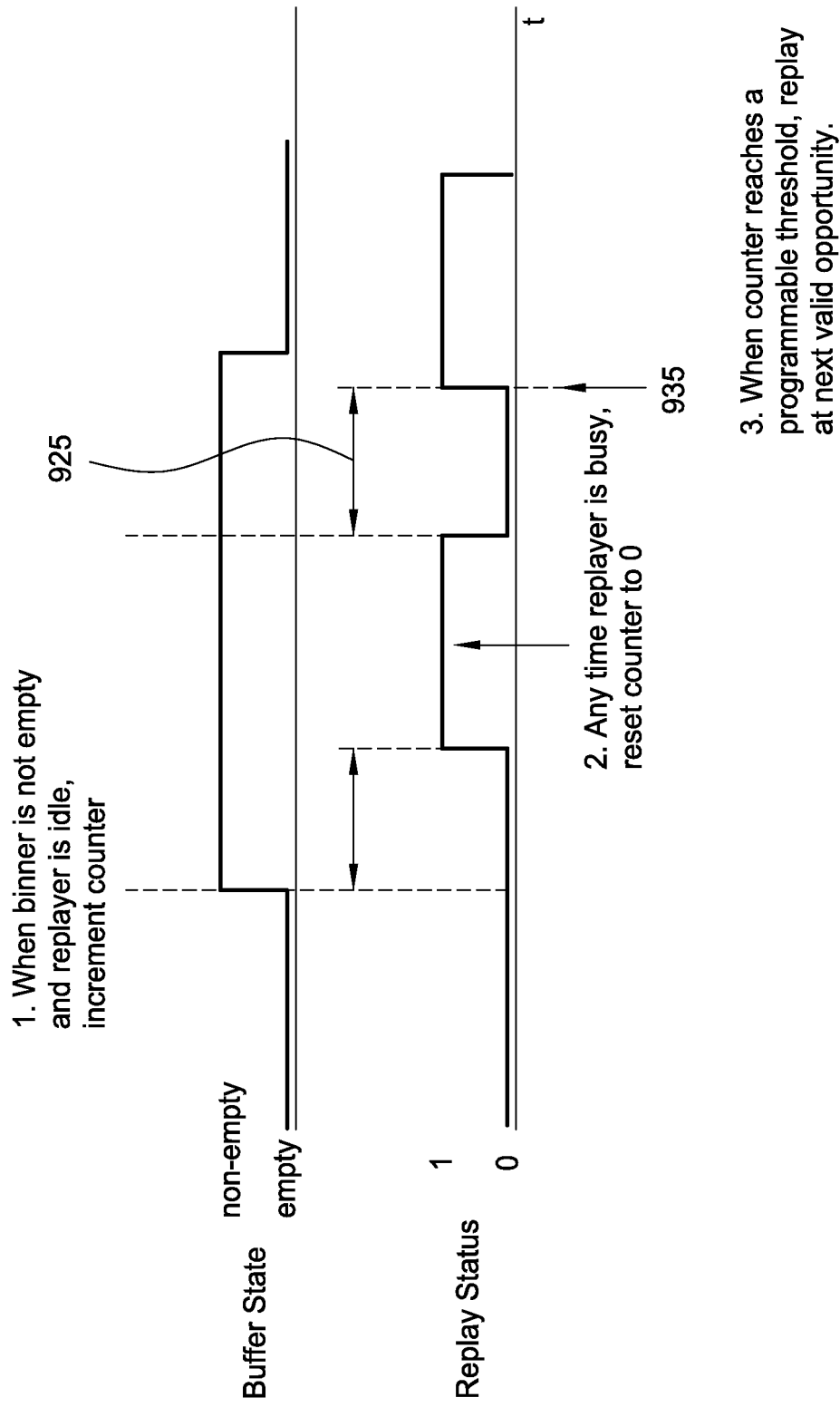
FIG. 9B is a conceptual diagram illustrating a replay of graphics primitives and state, according to one embodiment of the present invention.

FIG. 9A is a flow diagram of method steps for transmitting graphics primitives and state to a screen-space pipeline based on the state of a buffer and the amount of time since a replay, according to one embodiment of the present invention. Although the method steps are described in conjunction with the systems of FIGS. 1-4 and 9B, persons skilled in the art will understand that any system configured to perform the method steps, in any order, falls within the scope of the present invention.

As shown, a method 900 begins at step 910, where the tiling unit 375 determines whether a buffer in which graphics primitives and state received from the world-space pipeline 352 are stored (e.g., the buffer in tiling unit 375) is empty. If the buffer is empty, the tiling unit 375 continues to monitor the buffer to determine whether the buffer contains graphics primitives and/or state. If the buffer is not empty, then, at step 920, the tiling unit 375 determines whether a threshold period of time has elapsed since a replay was performed. If a threshold period of time has elapsed since the last replay was performed, then the method 900 proceeds to step 930, where the tiling unit 375 initiates a replay of buffered graphics primitives and state. In one embodiment, the threshold period of time is based on a number of clock cycles since the last replay was performed (e.g., 500 or 1000 clock cycles).

In one embodiment, as described above with respect to FIG. 6, the tiling unit 375 may determine that the rate at which graphics primitives and/or state are received from the world-space pipeline is below a threshold level. As a result, replays may be occurring too infrequently, causing the screen-space pipeline 354 to run out of work and, thus, decreasing processing efficiency. In response, the tiling unit 375 may initiate a replay so that the screen-space pipeline 354 is not idle for extended period of time. This technique is further illustrated in FIG. 9B, which is a conceptual diagram illustrating a replay of graphics primitives and state, according to one embodiment of the present invention. As shown, when a buffer is in a non-empty state and a threshold period of time 925 elapses since the last replay, a replay is initiated at time 935.

At step 940, the tiling unit 375 selects a cache tile 410 for processing. Steps 942, 944 and 946 are then performed in the same manner as described above with respect to steps 542, 544 and 546 in the method 500 of FIG. 5. At step 950, the tiling unit 375 determines whether the current cache tile 410 selected at step 940 is the last cache tile 410 to be processed during the replay. If the current cache tile 410 is not the last cache tile 410 to be processed during the replay, then the method 900 returns to step 940, where the tiling unit 375 selects an additional cache tile 410 for processing. If the current cache tile 410 is the last cache tile 410 to be processed during the replay, then the method 900 proceeds to step 960.

At step 960, the tiling unit 375 determines whether additional graphics primitives and/or state are to be processed. If additional processing is to be performed, then the method 900 returns to step 910. If no additional processing is to be performed, then the method 900 ends.

In sum, various techniques are disclosed for buffering and replaying graphics primitives and associated state prior to transmitting the graphics primitives and associated state to a screen-space pipeline for processing. While graphics primitives and state are being received from a world-space pipeline and stored in a buffer, the tiling unit, front end unit, and/or buffer manager may monitor various conditions, including the number of state bundles stored in the buffer, a number of buffer register allocations, and/or rendering state changes. Upon detecting a condition indicating that buffering additional graphics primitives and/or state may reduce processing efficiency, the tiling unit flushes the buffer and transmits the buffered graphics primitives and state to the screen-space pipeline. The tiling unit, front end unit, and/or buffer manager further determines, based on various criteria, whether the graphics primitives and associated state should be transmitted to the screen-space pipeline with the tiling function either enabled or disabled.

One advantage of the disclosed techniques is that tiling can be enabled and disabled in an intelligent manner in order to reduce overhead in the processing pipeline. In addition, when tiling is enabled, the buffering of graphics primitives and associated state can be controlled to further decrease overhead in the processing pipeline and, as a result, decrease power consumption of the graphics system.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for processing graphics primitives in a tile-based architecture, the method comprising:
    storing, in a buffer, a first plurality of graphics primitives;
    determining, based on a first condition that indicates a transition between an early z-test mode and a late z-test mode, that the first plurality of graphics primitives should be replayed from the buffer; and
    in response, replaying the first plurality of graphics primitives against a first tile included in a first plurality of tiles by:
        comparing each graphics primitive included in the first plurality of graphics primitives against the first tile to determine whether the graphics primitive intersects the first tile;
        determining that one or more graphics primitives included in the first plurality of graphics primitives intersects the first tile; and
        transmitting the one or more graphics primitives for processing.

2. The method of claim 1, wherein comparing each graphics primitive included in the first plurality of graphics primitives against the first tile comprises setting a scissor rectangle to a value that corresponds to the first tile.

3. The method of claim 1, further comprising:
    receiving, after replaying the first plurality of graphics primitives against the first tile, at least one state bundle associated with the transition between the early z-test mode and the late z-test mode;
    determining that the at least one state bundle should be processed in a pass-through mode; and
    transmitting the at least one state bundle to a screen-space pipeline for processing with a tiling function disabled.

4. The method of claim 3, wherein transmitting the at least one state bundle to the screen-space pipeline for processing comprises setting a scissor rectangle to a value that corresponds to a full screen-space recognized by the screen-space pipeline.

5. The method of claim 3, further comprising:
    determining that a second condition exists, wherein the second condition is that a graphics primitive included in a second plurality of graphics primitives has been received from a world-space pipeline, and the graphics primitive is the first graphics primitive received from the world-space pipeline after the at least one state bundle; and
    determining, based on the second condition, that the tiling function should be re-enabled and that the second plurality of graphics primitives should be stored in the buffer and replayed against the first tile included in the first plurality of tiles.

6. The method of claim 1, further comprising:
    determining, based on a second condition that indicates that at least one primitive is stored in the buffer and that no primitives have been replayed from the buffer for a threshold period of time, that a second plurality of graphics primitives should be replayed from the buffer; and
    in response, replaying the second plurality of graphics primitives against a second tile included in a second plurality of tiles.

7. The method of claim 1, further comprising:
    determining, based on a second condition that indicates that a number of state bundles stored in the buffer has reached a threshold level, that a second plurality of graphics primitives should be replayed from the buffer; and
    in response, replaying the second plurality of graphics primitives against a second tile included in a second plurality of tiles.

8. The method of claim 1, further comprising:
    determining, based on a second condition that indicates that at least one of a number of shader constant buffer bindings associated with one or more graphics primitives stored in the buffer and a number of constant buffer updates associated with one or more graphics primitives stored in the buffer has reached a threshold level, that a second plurality of graphics primitives should be replayed from the buffer; and
    in response, replaying the second plurality of graphics primitives against a second tile included in a second plurality of tiles.

9. The method of claim 8, wherein the threshold level is based on determining a first number of shader constant buffer bindings associated with a first streaming multiprocessor that remain allocated after replaying the first plurality of graphics primitives.

10. A graphics processing pipeline, comprising:
a world-space pipeline;
a screen-space pipeline; and
a tiler that:
  stores, in a buffer, a first plurality of graphics primitives and a first plurality of state bundles associated with the first plurality of graphics primitives;
  determines, based on a first condition that indicates a transition between an early z-test mode and a late z-test mode, that the first plurality of graphics primitives should be replayed from the buffer; and
  in response, replays the first plurality of graphics primitives against a first tile included in a first plurality of tiles by:
    comparing each graphics primitive included in the first plurality of graphics primitives against the first tile to determine whether the graphics primitive intersects the first tile;
    determining that one or more graphics primitives included in the first plurality of graphics primitives intersects the first tile; and
    transmitting the one or more graphics primitives and one or more state bundles associated with the one or more graphics primitives and included in the first plurality of state bundles for processing.

11. The graphics processing pipeline of claim 10, wherein the tiler compares each graphics primitive included in the first plurality of graphics primitives against the first tile by setting a scissor rectangle to a value that corresponds to the first tile.

12. The graphics processing pipeline of claim 10, wherein the tiler further:
  receives, after replaying the first plurality of graphics primitives against the first tile, at least one state bundle associated with the transition between the early z-test mode and the late z-test mode;
  determines that the at least one state bundle should be processed in a pass-through mode; and
  transmits the at least one state bundle to the screen-space pipeline for processing with a tiling function disabled.

13. The graphics processing pipeline of claim 12, wherein the tiler transmits the at least one state bundle to the screen-space pipeline for processing by setting a scissor rectangle to a value that corresponds to a full screen-space recognized by the screen-space pipeline.

14. The graphics processing pipeline of claim 12, wherein the tiler further:
  determines that a second condition exists, wherein the second condition is that a graphics primitive included in a second plurality of graphics primitives has been received from the world-space pipeline, and the graphics primitive is the first graphics primitive received from the world-space pipeline after the at least one state bundle; and
  determines, based on the second condition, that the tiling function should be re-enabled and that the second plurality of graphics primitives should be stored in the buffer and replayed against the first tile included in the first plurality of tiles.

15. The graphics processing pipeline of claim 10, wherein the tiler further:
  determines, based on a second condition that indicates that at least one primitive is stored in the buffer and that no primitives have been replayed from the buffer for a threshold period of time, that a second plurality of graphics primitives should be replayed from the buffer; and
  in response, replays the second plurality of graphics primitives against a second tile included in a second plurality of tiles.

16. The graphics processing pipeline of claim 10, wherein the tiler further:
  determines, based on a second condition that indicates that a number of state bundles stored in the buffer has reached a threshold level, that a second plurality of graphics primitives should be replayed from the buffer; and
  in response, replays the second plurality of graphics primitives against a second tile included in a second plurality of tiles.

17. The graphics processing pipeline of claim 10, wherein the tiler further:
  determines, based on a second condition that indicates that at least one of a number of shader constant buffer bindings associated with one or more graphics primitives stored in the buffer and a number of constant buffer updates associated with one or more graphics primitives stored in the buffer has reached a threshold level, that a second plurality of graphics primitives should be replayed from the buffer; and
  in response, replays the second plurality of graphics primitives against a second tile included in a second plurality of tiles.

18. The graphics processing pipeline of claim 17, wherein the threshold level is based on determining a first number of shader constant buffer bindings associated with a first streaming multiprocessor that remain allocated after replaying the first plurality of graphics primitives.

19. The graphics processing pipeline of claim 10, wherein the tiler couples the world-space pipeline to the screen-space pipeline, the tiler receives the first plurality of graphics primitives and the first plurality of state bundles from the world-space pipeline prior to storing the first plurality of graphics primitives and the first plurality of state bundles in the buffer, and the tiler transmits the one or more graphics primitives and the one or more state bundles to the screen-space pipeline for processing.

20. A computing device, comprising:
a memory; and
a graphics processing pipeline that includes:
  a world-space pipeline;
  a screen-space pipeline; and
  a tiler that:
    stores, in a buffer, a first plurality of graphics primitives and a first plurality of state bundles associated with the first plurality of graphics primitives;
    determines, based on a first condition that indicates a transition between processing modes, that the first plurality of graphics primitives should be replayed from the buffer; and
    in response, replays the first plurality of graphics primitives against a first tile included in a first plurality of tiles by:
      comparing each graphics primitive included in the first plurality of graphics primitives against the first tile to determine whether the graphics primitive intersects the first tile;
      determining that one or more graphics primitives included in the first plurality of graphics primitives intersects the first tile; and
      transmitting the one or more graphics primitives and one or more state bundles associated with the one or more graphics primitives and included in the first plurality of state bundles for processing.

21. The computing device of claim 20, wherein the tiler compares each graphics primitive included in the first plurality of graphics primitives against the first tile by setting a scissor rectangle to a value that corresponds to the first tile.

22. The computing device of claim 20, wherein the tiler couples the world-space pipeline to the screen-space pipeline, the tiler receives the first plurality of graphics primitives and the first plurality of state bundles from the world-space pipeline prior to storing the first plurality of graphics primitives and the first plurality of state bundles in the buffer, and the tiler transmits the one or more graphics primitives and the one or more state bundles to the screen-space pipeline for processing.

* * * * *

UNITED STATES PATENT AND TRADEMARK OFFICE
CERTIFICATE OF CORRECTION

PATENT NO. : 9,792,122 B2
APPLICATION NO. : 14/046856
DATED : October 17, 2017
INVENTOR(S) : Ziyad S. Hakura et al.

It is certified that error appears in the above-identified patent and that said Letters Patent is hereby corrected as shown below:

In the Claims

Column 26, Claim 20, Line 53, please delete "processing modes" and insert --an early z-test mode and a late z-test mode--.

Signed and Sealed this
Twenty-second Day of May, 2018

Andrei Iancu
*Director of the United States Patent and Trademark Office*